United States Patent
Stein

(10) Patent No.: US 12,546,884 B1
(45) Date of Patent: Feb. 10, 2026

(54) AUTOMATED DEPTH ESTIMATION FOR NON-DESTRUCTIVE TESTING

(71) Applicant: SMARTAUGER, INC., Wadsworth, OH (US)

(72) Inventor: Nathan Stein, Seattle, WA (US)

(73) Assignee: SMARTAUGER, INC., Wadsworth, OH (US)

( * ) Notice: Subject to any disclaimer, the term of this patent is extended or adjusted under 35 U.S.C. 154(b) by 0 days.

(21) Appl. No.: 19/200,159

(22) Filed: May 6, 2025

(51) Int. Cl.
G01S 13/88 (2006.01)
G01C 21/16 (2006.01)

(52) U.S. Cl.
CPC ............ G01S 13/885 (2013.01); G01C 21/16 (2013.01)

(58) Field of Classification Search
CPC ...... G01S 13/885; G01S 13/887; G01C 21/16
See application file for complete search history.

(56) References Cited

U.S. PATENT DOCUMENTS

| | | | |
|---|---|---|---|
| 6,377,872 B1* | 4/2002 | Struckman | E02F 9/205 700/258 |
| 6,621,462 B2 | 9/2003 | Barnes | |
| 8,253,619 B2* | 8/2012 | Holbrook | G01S 13/887 324/637 |
| 9,244,163 B2 | 1/2016 | Mohamadi | |
| 9,395,437 B2 | 7/2016 | Ton et al. | |
| 10,145,837 B2 | 12/2018 | Troxler | |
| 10,175,350 B1* | 1/2019 | Tsokos | G01V 3/12 |
| 10,203,405 B2 | 2/2019 | Mazzaro et al. | |
| 10,527,560 B2 | 1/2020 | Annan et al. | |
| 10,895,637 B1* | 1/2021 | Padmanabhan | G01S 19/14 |
| 2006/0055584 A1* | 3/2006 | Waite | G01V 11/00 342/55 |
| 2007/0194978 A1 | 8/2007 | Teshirogi et al. | |
| 2008/0036644 A1* | 2/2008 | Skultety-Betz | G01S 13/86 342/22 |
| 2014/0285375 A1* | 9/2014 | Crain | G01S 17/86 342/25 A |
| 2016/0313443 A1* | 10/2016 | Al-Shuhail | G01S 7/41 |
| 2018/0172866 A1* | 6/2018 | Vohra | G01V 3/34 |
| 2021/0405182 A1* | 12/2021 | Reynolds | G01S 13/887 |

(Continued)

OTHER PUBLICATIONS

Hou et al. "Improved Mask R-CNN with distance guided intersection over union for GPR signature detection and segmentation", Automation in Construction, vol. 121, Jan. 2021 (Year: 2021).*

(Continued)

*Primary Examiner* — Peter M Bythrow
(74) *Attorney, Agent, or Firm* — Mintz, Levin, Cohn, Ferris, Glovsky and Popeo, P.C. US

(57) ABSTRACT

A method for estimating a depth of one or more buried objects can include receiving, from a non-destructive testing (NDT) scanner, a B-Scan image of a scanned region. Using a machine learning model, a hyperbola in the B-Scan image can be identified. At least one geometric feature of the hyperbola can be determined. Based upon the at least one geometric feature of the hyperbola, a dielectric constant in at least a portion of the scanned region can be determined. A depth of the one or more objects beneath a surface of the scanned region can be determined based upon the determined dielectric constant.

21 Claims, 12 Drawing Sheets
(5 of 12 Drawing Sheet(s) Filed in Color)

(56) References Cited

U.S. PATENT DOCUMENTS

| | | |
|---|---|---|
| 2023/0115265 A1* | 4/2023 | Butt .................. H01Q 1/04 |
| | | 342/22 |
| 2023/0131412 A1* | 4/2023 | Aljabri ............. G01S 13/885 |
| | | 166/250.01 |
| 2023/0243959 A1* | 8/2023 | Donderici ........... G01S 13/87 |
| | | 342/70 |
| 2024/0061072 A1 | 2/2024 | Kaneider et al. |
| 2024/0134007 A1* | 4/2024 | Feng .................. G01S 7/412 |
| 2024/0184306 A1* | 6/2024 | Asmari ................ G01S 17/89 |
| 2024/0210552 A1* | 6/2024 | Kiyoshi ............... G01S 7/414 |
| 2024/0302523 A1* | 9/2024 | Blaunstein ........... H01Q 3/24 |
| 2024/0331127 A1* | 10/2024 | Ma .................... G01S 7/539 |
| 2025/0116535 A1* | 4/2025 | Berchtold-Buschle ................ |
| | | G01D 5/20 |
| 2025/0138182 A1 | 5/2025 | Lehner et al. |

OTHER PUBLICATIONS

Sun, H-H et al. (2021). "Compact Dual-Polarized Vivaldi Antenna with High Gain and High Polarization Purity for GPR Applications." Sensors, 21,503. 17 pages. https://doi.org/10.3390/s21020503.

* cited by examiner

AUTOMATED DEPTH ESTIMATION FOR NON-DESTRUCTIVE TESTING

FIELD

The present disclosure relates generally to non-destructive testing, for example ground penetrating radar (GPR).

BACKGROUND

Non-destructive testing (NDT) techniques are widely employed to analyze systems without causing damage. Most forms of NDT involve transmitting a signal (e.g., an electromagnetic signal or an acoustic signal) into a region of interest, detecting the reflection of the signal, and analyzing the reflected signal to extract information about the region. Examples of NDT include ultrasonic testing, radar testing, and eddy current testing.

One application of NDT is the evaluation of regions beneath a ground surface that cannot be directly accessed without digging. In the energy industry, subsurface NDT is leveraged to locate and inspect underground utilities such as pipes and cables. Subsurface NDT is also utilized by researchers across a variety of fields. Archaeologists, for example, may use NDT to map buried archaeological sites, while earth scientists may use NDT to study geologic features (e.g., bedrock, groundwater, etc.).

SUMMARY

Systems, methods, and non-transitory computer readable storage media for automatically determining the depth of subsurface objects detected during non-destructive testing are described.

In one aspect, a method is provided that includes receiving a B-Scan image of a scanned region from a non-destructive testing (NDT) scanner, identifying a hyperbola in the B-scan image using a machine learning model, determining at least one geometric feature of the hyperbola, determining, based upon the at least one geometric feature of the hyperbola, a dielectric constant in at least a portion of the scanned region, and determining, based upon the dielectric constant, a depth of one or more objects beneath a surface of the scanned region.

The machine learning model can be a computer vision model, for example an instance segmentation model, or any other suitable machine learning model. The machine learning model can be trained using training data including a plurality of B-Scan images from a geographic location in which the scanned region is located. Additionally, or alternatively, the machine learning model can be trained using training data including a plurality of B-Scan images generated by NDT scanners that are similar to the NDT scanner from which the B-Scan image was received.

Determining the at least one geometric feature of the hyperbola can include determining a curve that represents the hyperbola. The at least one geometric feature can include an apex location value, a curvature value, an amplitude value, or any other geometric feature.

In some embodiments, prior to identifying the hyperbola using the machine learning model, the B-Scan image can be processed. Processing the B-Scan image can include reducing noise in the B-Scan image, enhancing a contrast of the B-Scan image, or a combination thereof. In some embodiments, processing the B-Scan image includes receiving, from an inertial measurement unit (IMU) coupled to the NDT scanner, position data associated with the NDT scanner; and normalizing the B-Scan image based upon the position data.

Information indicating the dielectric constant and the depth of the object can be provided to a user (e.g., on a display of a user interface). For example, the information can be wirelessly transmitted to a processor of the NDT scanner, and the dielectric constant and the depth of the object can be displayed to the user by a user interface of the NDT scanner.

In another aspect, a system that includes at least one processor and non-transitory memory is provided. The non-transitory memory can store instructions that, when executed by the at least one processor, cause the at least one processor to perform operations including receiving, from a non-destructive testing (NDT) scanner, a B-Scan image of a scanned region, identifying, using a machine learning model, a hyperbola in the B-scan image, determining at least one geometric feature of the hyperbola, determining, based upon the at least one geometric feature of the hyperbola, a dielectric constant in at least a portion of the scanned region, and determining, based upon the dielectric constant, a depth of an object beneath a surface of the scanned region. In some embodiments, the system also includes the NDT scanner. In some embodiments, the processor and the non-transitory memory are components of the NDT scanner.

In another aspect a non-transitory computer readable storage medium is provided. The non-transitory computer readable storage medium can store instructions that, when executed by at least one processor, cause the at least one processor to perform operations including receiving, from a non-destructive testing (NDT) scanner, a B-Scan image of a scanned region, identifying, using a machine learning model, a hyperbola in the B-scan image, determining at least one geometric feature of the hyperbola, determining, based upon the at least one geometric feature of the hyperbola, a dielectric constant in at least a portion of the scanned region, and determining, based upon the dielectric constant, a depth of an object beneath a surface of the scanned region.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosed subject matter will be more readily understood from the following detailed description in conjunction with the accompanying drawings, in which.

DETAILED DESCRIPTION

Figure 1:
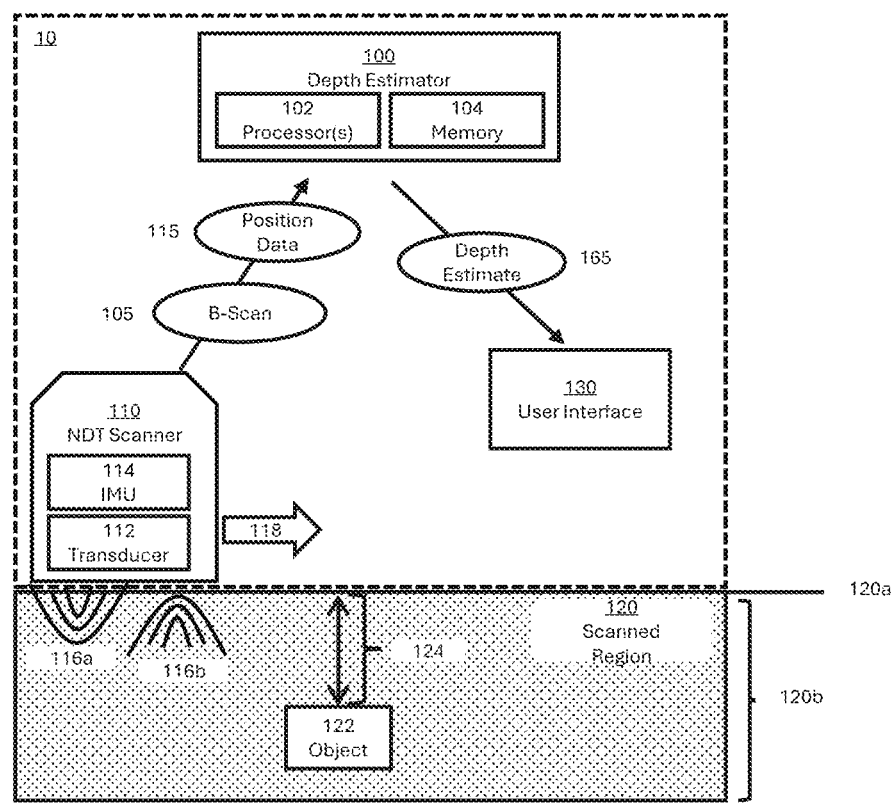
FIG. 1 shows a block diagram of an example non-destructive testing system.

Non-destructive testing (NDT) techniques can be employed to inspect objects beneath the ground surface. When an object of interest is detected through NDT, it is frequently necessary to determine the depth beneath the ground surface at which the object is located. Determining the depth requires knowledge of the speed at which the NDT signal travels through the subsurface medium. For example, determining the depth of an object detected using ground penetrating radar (GPR) requires knowledge of the speed at which light travels through the subsurface medium. Similarly, determining the depth of an object detected using ultrasonic testing (UT) requires knowledge of the speed at which sound travels through the subsurface medium.

The speed at which an NDT signal travels through a subsurface medium typically depends upon the physical properties (e.g., the dielectric constant, if the NDT signal is electromagnetic, the density, if the NDT signal is acoustic, etc.) of the subsurface medium. In most cases, however, the subsurface medium is composed of a variety of different materials having different physical properties. As a result, the speed of the NDT signal in the subsurface medium is generally not a known quantity and must be estimated in order to determine the depth at which a detected object is located.

Existing techniques for estimating the speed of an NDT signal in a subsurface medium (and, therefore, for determining the depth of buried objects detected using NDT) involve manually approximating the values of the physical properties of the subsurface medium that dictate the signal speed. In GPR testing, for instance, the dielectric constant of the subsurface medium is frequently approximated by assuming the material composition of the subsurface based upon the apparent material composition of the ground surface. For example, if the ground surface is comprised of sand, the subsurface may be assumed to be comprised of sand of a similar grain size and moisture content, and the dielectric constant may be approximated by, e.g., looking up a value for the dielectric constant of sand in a lookup table. The approximated dielectric constant value can then be used to compute the speed of light in the subsurface medium which, in turn, can be used to estimate the depth of detected objects.

Such manual estimation techniques are both error-prone and labor intensive. Depth estimates produced by experienced individuals can vary widely from those produced by those with less experience. Moreover, if the subsurface medium is not homogenous, its physical properties can vary significantly from those of the ground surface. Depth estimates made by assuming homogeneity of the subsurface medium may be highly inaccurate.

Disclosed herein is a fully automated process for estimating the depth of objects detected during an NDT scan of a subsurface environment. The process leverages an innovative combination of machine learning and algorithmic geometric analysis to accurately determine the depth of objects detected using NDT based only upon B-Scan images received from an NDT scanner. The B-Scan images are provided to a specialized computer vision model that is trained to identify shapes (e.g., hyperbolic curves) in the images that signify the presence of buried objects. The computer vision model's precise identification of these shapes enables geometric features of the shapes to be automatically extracted. From the extracted geometric features, physical properties (e.g., the dielectric constant) of the scanned region can be determined which, in turn, can be used to determine the depth of the buried objects.

The disclosed process provides numerous technical advantages. The process enables object depth to be determined in real time or near real time, e.g., as an NDT scan is being performed, significantly increasing the rate at which objects can be inspected. Additionally, the process is highly adaptable. For example, the process can be adapted for execution by a computer system that is integrated with an NDT scanner, enabling depth estimates to be made even when scans are performed in remote locations. Alternatively, the process can be adapted for execution by a computer system that is wirelessly coupled (e.g., via a network) to an NDT scanner, thereby increasing scanner's portability and maneuverability. The process can also be easily fine-tuned to perform depth estimation in a particular environment (e.g., an environment with a unique subsurface material composition) or for integration with a particular type or brand of NDT scanner.

Certain implementations will now be described to provide an overall understanding of the principles of the structure, function, manufacture, and use of the devices and methods disclosed herein. One or more examples of these implementations are illustrated in the accompanying drawings. Those skilled in the art will understand that the devices and methods specifically described herein and illustrated in the accompanying drawings are non-limiting implementations and that the scope of the present invention is defined solely by the claims. The features illustrated or described in connection with one implementation may be combined with the features of other implementations. Such modifications and variations are intended to be included within the scope of the present invention.

Further, in the present disclosure, like-named components of the implementations generally have similar features, and thus within a particular implementation each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

A block diagram of an exemplary NDT system 10 is illustrated in FIG. 1. In the illustrated implementation, the system 10 includes a depth estimator 100, an NDT scanner 110, and a user interface 130. The system 10 can be used to estimate the depth 124 of an object 122 that located in a region 120 that is scanned by the NDT scanner 110.

The scanned region 120 includes an exposed ground surface 120*a* and a subsurface region 120*b* that extends below the ground surface 120*a*. The scanned region 120 can be any land region, for example a region of a field, a region of a desert, a region of a city or a suburb (e.g., a city block), a region of an archaeological site (e.g., a cemetery), a region of a glacier, or the like. In some implementations, the scanned region 120 can be an underwater region, for example a region of an ocean floor or a region of a river bed or a lake bed. In some implementations, the scanned region 120 can be a region that is not located on Earth, for example a region of another planet (e.g., Mars) or a region of a moon (e.g., a region of Earth's Moon, a region of a moon of Jupiter, etc.). The extent of the scanned region 120 (in any direction) can vary depending on the purpose of the NDT scan. The scanned region 120 can be composed of any material or combination of materials, and its material composition can be non-uniform. Example materials that can be present in the scanned region 120 include (but are not limited to) soil, clay, sand, granite, limestone, ice, water, concrete, metals, asphalt, basalt, shale, loam, silt, peat, permafrost, brick, plastic fiberglass, gravel, and/or regolith.

The object 122 can be a single object or multiple objects. The object 122 can be any item situated (e.g., buried) in the subsurface 120*b* of the scanned region 120. For example, the object 122 can be a deposit of a particular element, alloy, or metal (e.g., a gold deposit), an environmental or geologic feature (e.g., a void, a tree root, etc.), a piece of infrastructure (e.g., a utility line, a pipe, a tunnel, a sewer line, a storm drain, etc.), an archaeological feature or artifact (e.g., a tool, a portion of a building, buried remains, etc.), or an object of military interest (e.g., an explosive device such as a mine).

The depth 124 of the object 122 can be the minimum separation distance between the ground surface 120*a* and the object 122. That is, the depth 124 of the object 122 can be the separation distance between the ground surface 120*a* and the shallowest part of the object 122 (e.g., the part of the object that is closest to the ground surface 120*a*). The depth 124 can be at least 6 inches, at least 1 foot, at least 2 feet, at least 3 feet, at least 4 feet, at least 5 feet, at least 10 feet, at least 50 feet, or at least 100 feet.

The NDT scanner 110 can be any NDT scanning device or apparatus for which reflected signals produce hyperbolic patterns. In some implementations, the NDT scanner 110 can be a ground penetrating radar (GPR) scanner. In some implementations, the NDT scanner 110 can be an air-coupled GPR system. In some implementations, the NDT scanner 110 can be an ultrasonic testing (UT) scanner. In some implementations, the NDT scanner 110 can be a seismic reflection imaging system. In some implementations, the NDT scanner 110 can be an acoustic tomography system.

As shown in FIG. 1, the NDT scanner 110 can include a transducer 112. The transducer 112 can be any suitable device or combination of devices configured to emit signals 116*a* (e.g., a radar signal, an ultrasound signal, etc.) into the subsurface region 120*b* and to detect signals 116*b* that are reflected by the subsurface region 120*b*. For example, if the NDT scanner 110 is a GPR scanner, the transducer 112 can comprise a radar antenna. Similarly, if the NDT scanner is a UT scanner, the transducer 112 can comprise an ultrasonic transducer.

The signals 116*a* emitted by the transducer 112 can be pulsed signals, continuous wave signals, or a combination thereof. The transducer 112 can be configured to detect the reflected signals 116*b* with sufficient resolution to identify subsurface reflection patterns. In some implementations, the transducer 112 includes both a signal transmitter and a signal receiver. In some implementations, the transducer 112 includes a single device used in a pulsed (monostatic) configuration or a single device used in a bistatic configuration (e.g., a transmitter and a receiver that are spatially separated).

The NDT scanner 110 can be configured to be moved along the ground surface 120*a*, e.g., as indicated by arrow 118 in FIG. 1. In some implementations, the NDT scanner 110 can be configured to be moved manually, for example by being pushed or pulled by a user. In some implementations, the NDT scanner 110 can be configured to be moved by a motor. For example, the NDT scanner 110 can be coupled to a motorized vehicle or robot that is configured to move the NDT scanner 110 along the ground surface 120*a*. The NDT scanner 110 can include or be coupled to an inertial measurement unit (IMU) 114 and/or another suitable device that is configured to measure the position of the NDT scanner 110 as it moves.

As the NDT scanner 110 is moved over the ground surface 120*a*, the transducer 112 can transmit signals 116*a* into the subsurface 120*b*. A portion 116*b* of each transmitted signal 116*a* is reflected by the subsurface medium 120*b* and can be detected by the transducer 112. The NDT scanner 110 can include a computer system that is configured to determine the intensity of the received reflected signals 116*b*. When a transmitted signal 116*a* encounters an anomaly in the subsurface region 120*b* (e.g., when a signal 116*a* encounters a surface of the object 122), the intensity of the corresponding reflected signal 116*b* can change. Data indicating the relative intensity of the received reflected signals 116*b*, together with data indicating the distance traveled by the NDT scanner 110 and the signal travel time, can be used by the computer system of the NDT scanner 110 to generate an image, known as a B-Scan image, of the scanned region 120*b*.

Figure 2:
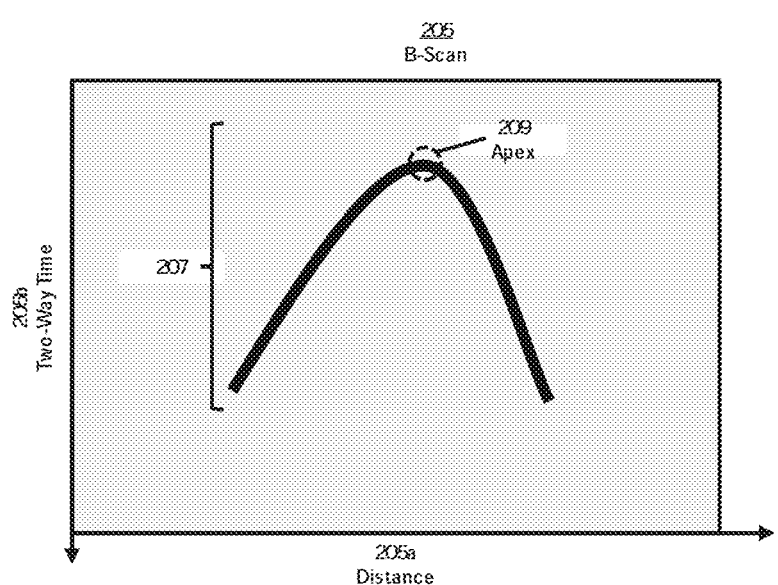
FIG. 2 shows a diagram of an example B-Scan image.

A diagram of an example B-Scan image 205 is provided in FIG. 2. The B-Scan image 205 can be produced by an NDT scanner such as the NDT scanner 110 shown in FIG. 1. As shown, the horizontal axis 205*a* of the B-Scan image 205 represents the distance (measured in, e.g., meters) that the NDT scanner has traveled from a preset origin location. The vertical axis 205*b* of the B-Scan image 205 represents the two-way travel time (measured in, e.g., nanoseconds) of the transducer signal, that is, the total time between when a signal (e.g., the signal 116*a* shown in FIG. 1) is emitted by the NDT scanner and when the signal's reflection (e.g., the reflected signal 116*b*) is detected by the NDT scanner.

Each point that makes up the B-Scan image 205 indicates the intensity of the reflected signal detected by the NDT scanner at a given time. A buried object (e.g., the object 122 shown in FIG. 1) with different physical properties (e.g., a different dielectric constant, a different density, etc.) than the surrounding subsurface medium causes signals to reflect at a different intensity than the surrounding medium. In the B-Scan image 205, such an object can appear as a curve 207. In the illustrated example, the curve 207 is a hyperbola. However, in some cases, such a curve may have irregularities in its shape due to, e.g., acceleration of the NDT scanner during the scanning operation. The apex 209 of the curve 207 corresponds to the portion of the object that is closest to the ground surface of the scanned region.

As described, in some implementations, an NDT scanner can have a bistatic configuration, that is, can include a transmitter and a receiver that are spatially separated. For example, an NDT scanner can include two spatially separated antennas. In these bistatic implementations, reflected signals in a B-Scan image can appear as an ellipse whose foci coincide with instantaneous transmitter and receiver ground projections.

Referring again to FIG. 1, when the NDT scanner 110 generates a B-Scan 105, the NDT scanner 110 can be configured to provide the B-scan 105 to the depth estimator 100. The depth estimator 100 can be any suitable device or combination of devices that includes at least one data processor 102 and memory 104 storing instructions configured to cause the processor(s) 102 to perform operations. For example, the depth estimator 100 can be or include a server, a desktop computer, a laptop computer, a tablet, a smart phone, an application-specific integrated circuit (ASIC), a field programmable gate array (FPGA), or a combination thereof. The processor(s) 102 can include any processor suitable for the execution of a computer program. For example, the processor(s) 102 can include a central processing unit (CPU), a graphics processing unit (GPU), a general-purpose microprocessor, or a special-purpose microprocessor, or a combination thereof. Memory 104 can include read-only memory (ROM), random access memory (RAM), an optical disk (e.g., a CD), a flash memory device, a removable hard drive, an internal hard disk, and/or the like.

The depth estimator 100 can be configured to generate a depth estimate 165 for the object 122 using the B-Scan 105 received from the NDT scanner 110. The depth estimate 165 can be an estimate of the depth 124 beneath the ground surface 120a at which the object 122 is located.

In addition to providing the B-Scan 105 to the depth estimator 100, the NDT scanner 110 can be configured to provide position data 115 measured by the IMU 114 to the depth estimator 110. The depth estimator 100 can be configured to use the position data 115 to normalize the B-Scan 105 prior to generating the depth estimate 165. Normalizing the B-Scan 105 using the position data 115 can increase the accuracy of the depth estimate 165.

In the illustrated implementation, the depth estimator 100 is independent from the NDT scanner 110. For example, the depth estimator 100 can be implemented using a server that is remote from the NDT scanner 110 or a laptop computer that can be selectively coupled to the NDT scanner 110. In these implementations, the depth estimator 100 can be communicatively coupled to receive data (e.g., the B-Scan 105) from the NDT scanner 110 by a wired connection or by a wireless network (e.g., a Bluetooth connection, a Wi-Fi connection, etc.). In other implementations, the depth estimator 100 is a component of the NDT scanner 110. For example, the depth estimator 100 can be implemented using the computer system of the NDT scanner 110 that generates the B-Scan 105. Implementing the depth estimator 100 using a computer system that is not a component of the NDT scanner 110 can reduce the computational power needed by the NDT scanner 110, thereby reducing the overall size of the NDT scanner 110 and, as a result, enhancing the portability and maneuverability of the NDT scanner 110. Implementing the depth estimator 100 using a computer system that is a component of the NDT scanner 110 can enable the depth estimate 165 to be generated even in highly remote locations where network connectivity is limited or nonexistent.

The depth estimator 100 can be configured to output the depth estimate 165, for example, by providing the depth estimate 165 to the user interface 130. The user interface 130 can be any suitable device or combination of devices configured to receive input from and output information to a user (e.g., an operator of the NDT scanner 110). For example, the user interface 130 can include a display (e.g., a LCD display, a monitor, a touchscreen display, etc.), a user input device (e.g., a keyboard, a microphone, a computer mouse, etc.), a speaker, and/or the like. In some implementations, the user interface 130 is a component of the depth estimator 100. In some implementations, the user interface 130 is a component of the NDT scanner 110. In some implementations, the user interface 130 is distinct from both the depth estimator 100 and the NDT scanner 110. For instance, the user interface 130 can be a touchscreen display of a tablet that is not a component of either the depth estimator 100 or the NDT scanner 110.

Figure 3:
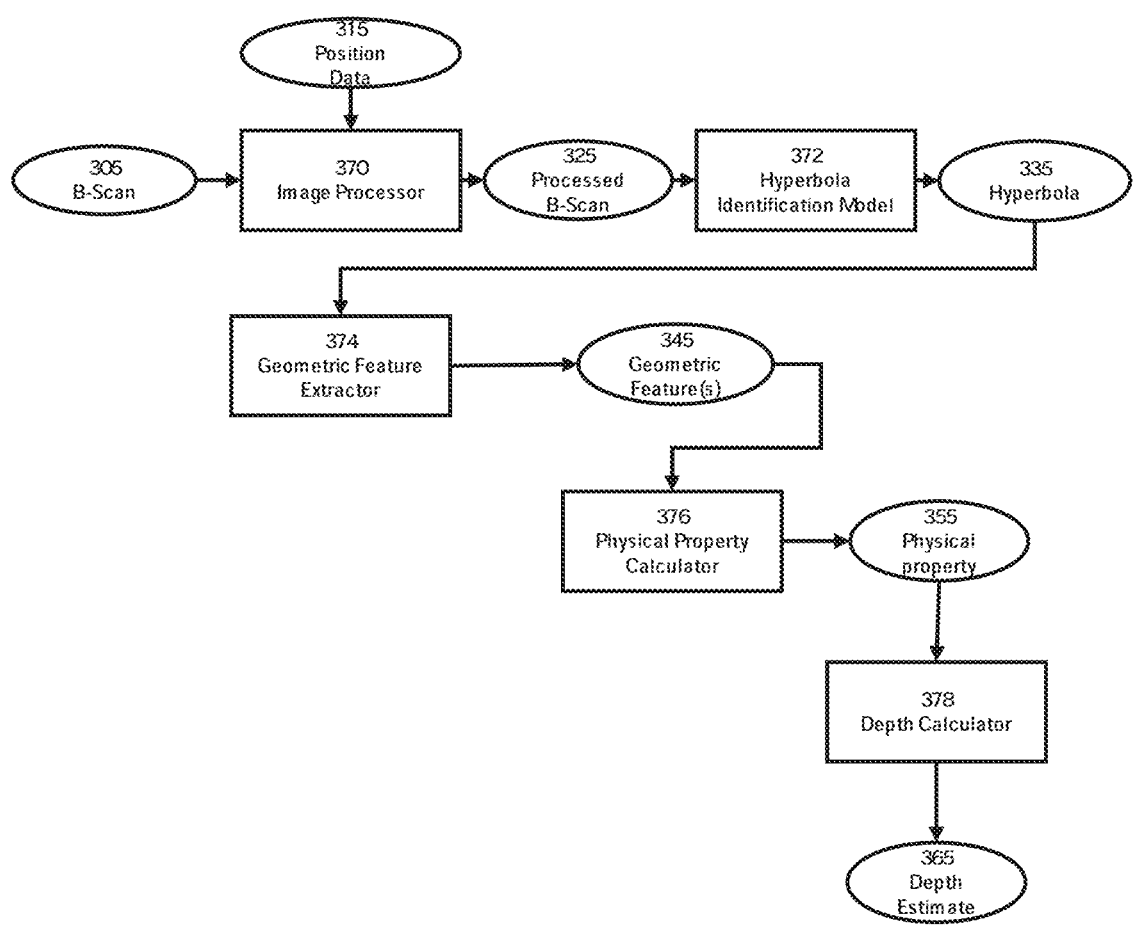
FIG. 3 shows a diagram of software components in an example depth estimation system.

FIG. 3 is a diagram of the software components of an exemplary depth estimator such as the depth estimator 100 shown in FIG. 1. In the illustrated implementation, the software components include an image processor 370, a hyperbola identification model 372, a geometric feature extractor 374, a physical property calculator 376, and a depth calculator 378. The software components can be computer-readable instructions stored in the memory of the depth estimator (e.g., the memory 104 of the depth estimator 100) that, when executed by the processor(s) of the depth estimator (e.g., the processor(s) 102 of the depth estimator 100), cause the processor(s) to perform operations to generate a depth estimate 365 for a subsurface object (e.g., the object 122 shown in FIG. 1) detected using an NDT scanner (e.g., the NDT scanner 110 shown in FIG. 1).

The image processor 370 can be any software component (e.g., computer program or combination of computer programs) configured to process raw B-Scans. A raw B-Scan image 305 received from the NDT scanner can be provided as input to the image processor 370. The image processor 370 can be configured to crop, rotate, enhance, sharpen, smooth, brighten, filter, or otherwise manipulate the raw B-Scan 305 to produce a processed B-Scan image 325. Each processed B-scan image 325 output by the image processor 370 can be of a similar quality and can have similar characteristics (e.g., size, orientation, etc.).

In some implementations, the image processor 370 can be configured to normalize the raw B-Scan image 305 received from the NDT scanner using position data 315 for the NDT scanner received from an IMU (e.g., the IMU 114 of the NDT scanner 110 shown in FIG. 1) that is coupled to the NDT scanner. The IMU data can be used to estimate the relative along-scan position of each column in the raw B-Scan 305. The columns may be set to a fixed width. If a column is oversampled along-track, the intensities in the column can be averaged. If there is a gap in the along-track direction, the missing intensities can be interpolated based on the rest of the B-Scan image, e.g., using a technique such as simple averaging, sliding kernel filters, or a deep learning technique such as a generative adversarial network. Normalizing the raw B-scan image 305 using the position data 315 from the IMU can generate a processed B-Scan image 325 in which each pixel represents a fixed distance and a fixed time interval.

The processed B-Scan image 325 can be provided as input to the hyperbola identification model 372. The hyperbola identification model 372 can be any machine learning model or combination of machine learning models trained to identify one or more hyperbolas 335 in the processed B-Scan image 325 that signify the presence of a subsurface object.

In some implementations, the hyperbola identification model 372 is a computer vision model. For example, the hyperbola identification model 372 can be an object detection model that is configured to generate non-oriented bounding boxes around portions of the B-Scan that the model has determined as containing hyperbolas. The hyperbola identification model 372 can also be a segmentation model, e.g., an instance segmentation model that is configured to generate a map that assigns each pixel in the B-Scan to an object (e.g., to a hyperbola instance or to a non-hyperbola object).

The hyperbola identification model 372 can be trained using training data comprising numerous B-Scan images. During training, the hyperbola identification model 372 can be tuned to a particular environment or to a particular type of NDT scanner by including in the training data a higher proportion of B-Scan images from a particular geographic region or a higher proportion of B-Scan images generated by NDT scanners of a particular type, manufacture, etc. (e.g., NDT scanners similar to an NDT scanner that will provide B-Scans to the hyperbola identification model 372).

The identified hyperbola(s) 335 can be provided as input to the geometric feature extractor 374. The geometric feature extractor 374 can be any software component (e.g., computer program or combination of computer programs) configured to determine geometric features 345 of the identified hyperbola(s) 335. For example, the geometric feature extractor 374 can include a curve fitting model configured to determine a hyperbolic function that best fits each identified hyperbola 335. The geometric feature extractor 374 can be configured to use curves determined by the curve fitting model to determine geometric features (e.g., apex location, steepness, etc.) of each hyperbola 335.

The determined geometric features 345 can be provided as input to the physical property calculator 355, which can be any software component (e.g., computer program or combination of computer programs) configured to determine one or more physical properties 355 (e.g., density, dielectric constant, etc.) of the scanned region based upon the geometric features 345. These determined physical properties 355 can then be provided as input to the depth calculator 378, which can be any software component (e.g., computer program or combination of computer programs) configured to determine the depth 365 of the subsurface object based upon the physical properties 355.

Figure 4:
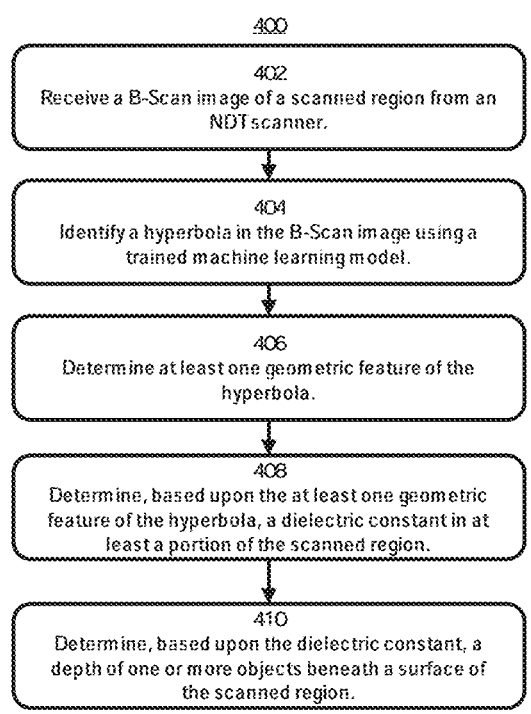
FIG. 4 shows a flowchart of an example depth estimation method.

FIG. 4 provides an exemplary method 400 of estimating the depth of a subsurface object detected during an NDT scan that utilizes electromagnetic signals (e.g., a GPR scan). The method 400 can be performed, all or in part, by a processor of a computer system, for example the processor 102 of the depth estimator 100 shown in FIG. 1.

The method 400 is intended only as an example implementation of a method of estimating the depth of a subsurface object detected during an NDT scan. Those skilled in the art will appreciate that the example depth estimation method 400 can be adapted for NDT scans that utilize signals other than electromagnetic signals, for example UT scans. Additionally, in some implementations, a depth estimation method can be performed in a different order than the method 400 of FIG. 4. In some implementations, a depth estimation method can include aspects in addition to those of the method 400 of FIG. 4, and in some implementations, a depth estimation method can omit aspects of the method 400 of FIG. 4.

At 402, a B-Scan image (e.g., the B-Scan image 105 shown in FIG. 1, the B-Scan image 205 shown in FIG. 2, etc.) of a scanned region (e.g., the scanned region 120 shown in FIG. 1) can be received from the NDT scanner. The NDT scanner can be a GPR scanner or another scanner configured to emit and receive electromagnetic signals. In some implementations, upon receipt, the B-Scan image can be processed (e.g., by an image processing software component such as image processor 370 shown in FIG. 3) to produce a processed B-Scan image. For example, the received B-Scan image can be normalized using position data associated with the NDT scanner received from an IMU (e.g., the IMU 114 shown in FIG. 1) coupled to the NDT scanner.

After the B-Scan image is received from the NDT scanner, the B-Scan image can be provided as input to a trained machine learning model (e.g., the hyperbola identification model 372 shown in FIG. 3). The machine learning model can be a computer vision model, for example an instance segmentation model. At 404, a hyperbola can be identified in the received B-Scan image by the trained machine learning model.

Figure 5:
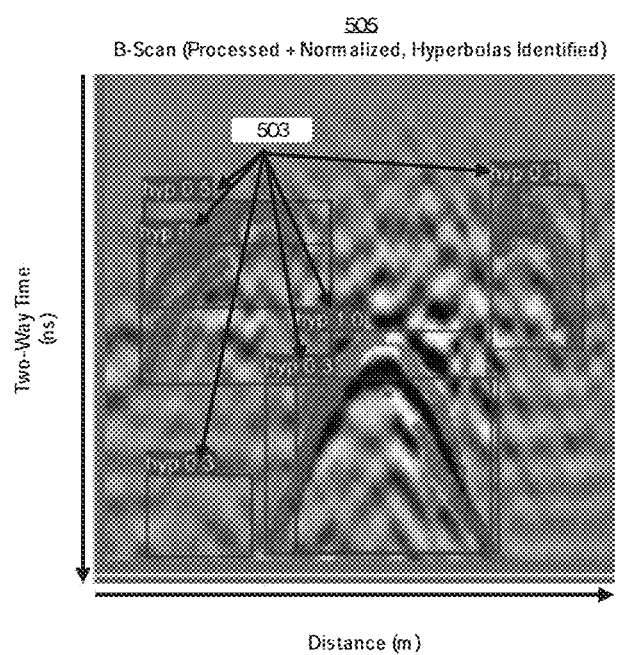
FIG. 5 shows hyperbolas that were identified by a trained hyperbola identification model in an example B-Scan image.
Figure 6:
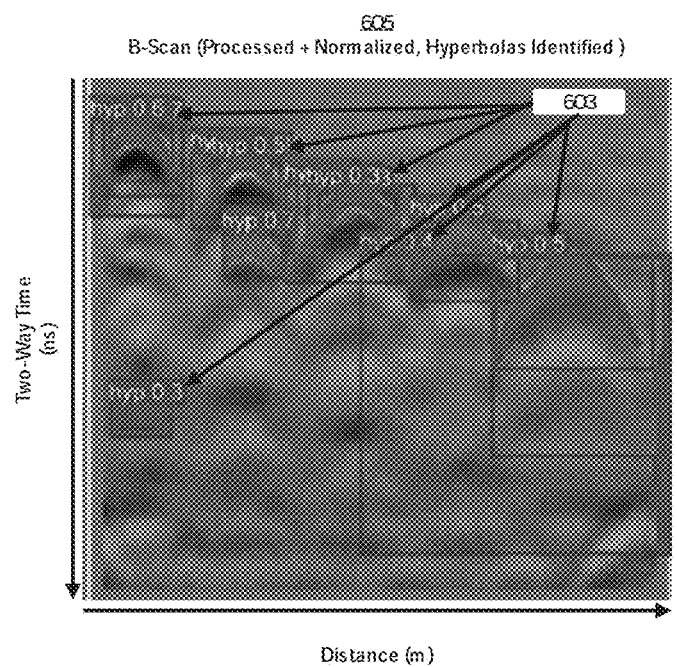
FIG. 6 shows hyperbolas that were identified by a trained hyperbola identification model in another example B-Scan image.
Figure 7:
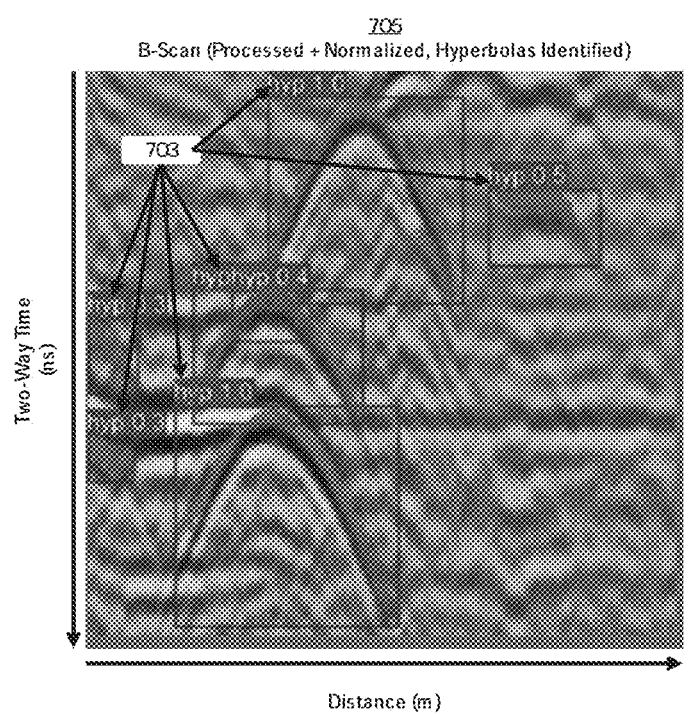
FIG. 7 shows hyperbolas that were identified by a trained hyperbola identification model in another example B-Scan image.

FIGS. 5, 6, and 7 show outputs from an example hyperbola identification model. In these examples, the hyperbola identification model is an instance segmentation model that is trained to output a pixel map that assigns each pixel in the B-Scan image to a particular object instance, e.g., to a particular hyperbola. The hyperbola identification model in these examples also outputs a confidence value or score for each identified hyperbola instance that indicates a likelihood that the object is an actual hyperbola (that is, a hyperbola that corresponds to a subsurface object). In these examples, the confidence score generated by the hyperbola identification model is a numerical value between 0 and 1, with 1 indicating the highest likelihood that the identified hyperbola instance is an actual hyperbola. In other implementations, a hyperbola identification model may not output a confidence value.

FIG. 5 shows outputs 503 generated by the example hyperbola identification model for one example B-Scan image 505. The outputs 503 include six identified hyperbola instances with confidence scores ranging from 0.3 to 1.0.

FIG. 6 shows outputs 603 generated by the example hyperbola identification model for another example B-Scan image 605. The outputs 603 include fifteen identified hyperbola instances with confidence scores ranging from 0.3-0.7.

FIG. 7 shows outputs 703 generated by the example hyperbola identification model for another example B-Scan image 705. The outputs 703 include seven identified hyperbola instances with confidence scores ranging from 0.3-1.0.

Confidence scores generated by a hyperbola identification model can be used to filter the model's outputs so that only those identified object instances that are most likely to be actual hyperbolas are retained for further analysis. For example, model outputs with a confidence score below a threshold score value can be discarded as spurious hyperbola detections. Such a threshold confidence score value can be determined empirically based on the performance of the hyperbola identification model on a validation dataset. For example, the threshold score value can be chosen as the value that maximizes an F1 (harmonic mean of precision and recall) score against the validation dataset.

Figure 8:
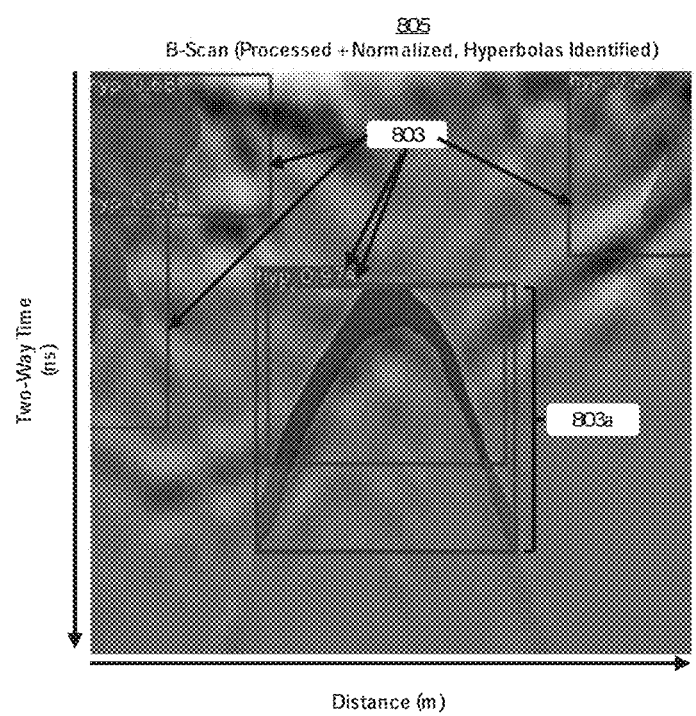
FIG. 8 shows a hyperbola in an example B-Scan image that was identified with high-confidence by a trained hyperbola identification model.

FIG. 8 shows outputs 803 generated by the example hyperbola identification model described above with respect to FIGS. 5-7. The outputs 803 were generated for an example B-Scan image 805 and include five identified hyperbola instances with confidence scores ranging from 0.27-0.97. In this example, a threshold confidence score of 0.7 was used to filter the outputs 803 to remove spurious hyperbola detections. As shown, a subset 803*a* of the outputs 803 have sufficiently high confidence scores and are therefore classified as detections requiring further analysis. The remaining outputs have confidence scores below the threshold score value and, as such, are identified as detections likely to be spurious.

Filtering to remove the detections identified as spurious can be performed using any suitable technique. In some implementations, a binary mask can be generated that assigns a first value (e.g., 0) to pixels in the B-Scan that were mapped by the hyperbola identification model to a non-hyperbola object instance or to a hyperbola instance identified as spurious and assigns a second value (e.g., 1) to pixels in the B-Scan that were mapped by the hyperbola identification model to a hyperbola instance identified as likely corresponding to an actual hyperbola. The output binary mask can be a manipulated version of the B-Scan image in which pixels mapped to the first value are displayed in a first color (e.g., black) and pixels mapped to the second value are displayed in a second color (e.g., white).

Figure 9A:
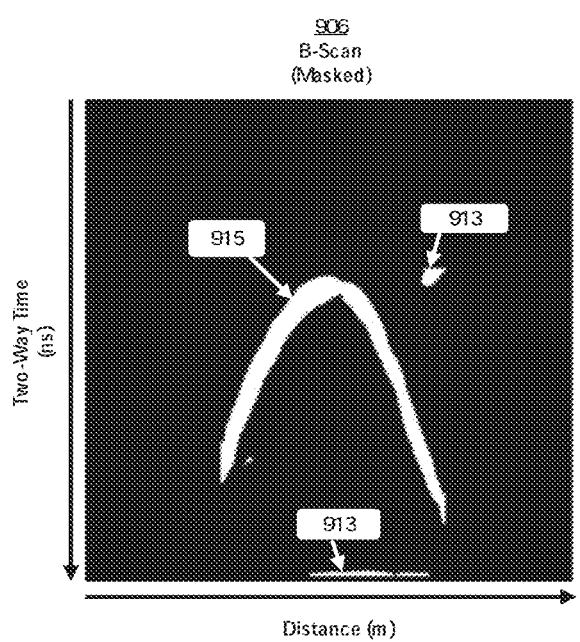
FIG. 9A shows a binary mask of the example B-Scan image shown in FIG. 8A.

FIG. 9A shows a masked version 906 of the example B-Scan 805 shown in FIG. 8. The white pixels 913 and 915 correspond to the pixels that form the subset 803a of the model outputs 803 with confidence scores above the threshold confidence score value.

In some implementations, the model's outputs can be filtered to eliminate duplicate or redundant hyperbola instances. Detected hyperbola instances that overlap beyond a threshold overlap amount can be rejected as duplicate or redundant detections. The overlap between any pair of detected hyperbola instances can be the area of intersection between the pair of hyperbola instances and can be computed, e.g., as the mask intersection over union of the hyperbola detections (i.e., the ratio of number of pixels shared by the masks for the pair of hyperbola instances to the total number of pixels in the union of the masks for the pair of hyperbola instances). The threshold overlap amount can be chosen empirically, e.g., as an overlap amount that maximizes an F1 score.

After a masked version of a B-Scan is generated, an additional filtering process can be performed to remove isolated segments that are unlikely to belong to an actual hyperbola. This additional filtering process can involve identifying connected sets of pixels that belong to the same model detection and rejecting all but the largest connected set. In other words, segmented hyperbola instances that have less than a threshold number of pixels can be discarded. The threshold number of pixels can be selected empirically, e.g., to maximize an F1 score.

Figure 9B:
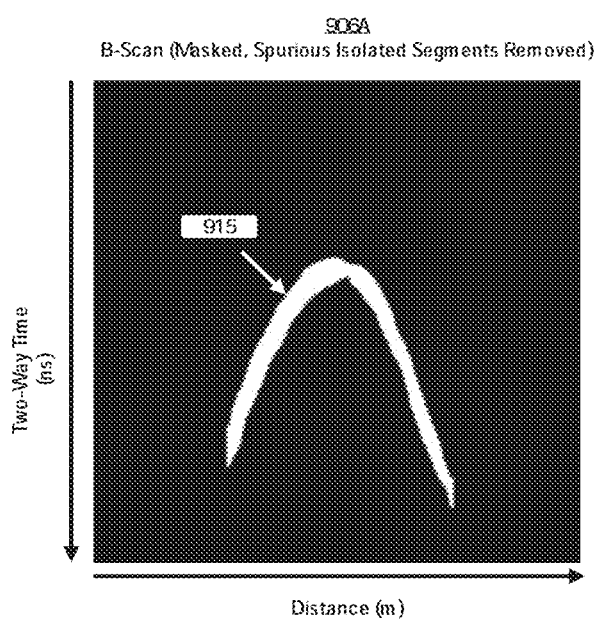
FIG. 9B shows the binary mask of the B-scan image of FIG. 9A with spurious, isolated mask segments removed.

FIG. 9B shows a filtered version 906A of the masked B-Scan 906 of FIG. 9A. In the filtered version 906A, the smaller, isolated subsets of white pixels 913 that were present in the unfiltered version 906 have been removed such that only the largest connected set of white pixels 915 remains.

Referring again to FIG. 4, after a hyperbola has been identified in the B-Scan image by the trained machine learning model at 404, at least one geometric feature of the hyperbola can be identified at 406. The geometric feature(s) can be automatically identified by a software component such as the geometric feature extractor 374 shown in FIG. 3.

In some implementations, identifying the geometric feature(s) of an identified hyperbola can involve determining a center line of the set of pixels in the masked version of the B-Scan that belong to the hyperbola. The points in the masked version of the B-Scan that constitute the center line can be determined as the midpoint between the top and bottom of the set of hyperbola pixels along the time axis of the image. Once the center line points are determined, a curve can be fit to the center line. In some implementations, the determined curve can be a hyperbolic function that fits the center line such that the difference between the function value at any given point and the corresponding point on the center line is below a threshold value.

Figure 9C:
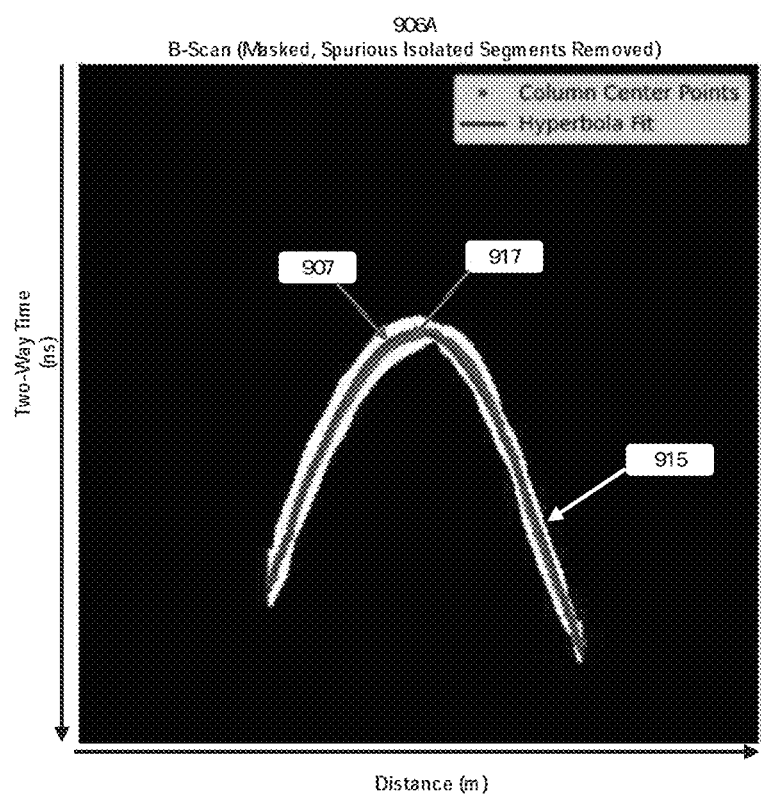
FIG. 9C shows the binary mask of the B-Scan image of FIG. 9B with mask center points and a mask curve fit overlaid.

FIG. 9C shows the filtered, masked B-Scan 906A of FIG. 9B with a center line 917 and a hyperbola fit 907 for the center line identified. As shown, the points that constitute the center line 917 are midpoints along the time axis (that is, the vertical axis) between the top and bottom of the set of pixels 915 that form the hyperbola mask. The hyperbola fit 907 is a hyperbolic function that has been fit to the center line 907. That is, the hyperbolic fit 907 is function of the form shown in Equation 1:

$$t(x) = \sqrt{t_0^2 + \left(\frac{(x-x_0)}{v}\right)^2} \tag{1}$$

In Equation 1, the variable x represents values along the distance axis (i.e., the horizontal axis) and corresponds to a distance from the origin point of the NDT scan, the variable t represents values along the time axis (i.e., the vertical axis) and corresponds to the two-way travel time of the NDT signal, the parameter v represents the velocity of the NDT signal in the subsurface medium, the parameter $x_0$ represents the location along the distance axis (i.e., the horizontal axis) of the hyperbola apex point, and the parameter $t_0$ represents the location along the time axis (i.e., the vertical axis) of the hyperbola apex point.

The determined curve fit can be used to determine one or more geometric features of the hyperbola identified in the B-Scan. The geometric feature(s) can include, e.g., the location (along the distance axis and the time axis) of the apex point of the hyperbola (i.e., the values of the parameters $x_0$, $t_0$ in Equation 1), the steepness of the hyperbola (related to the value of the parameter v in Equation 1), or a combination thereof.

Figure 10:
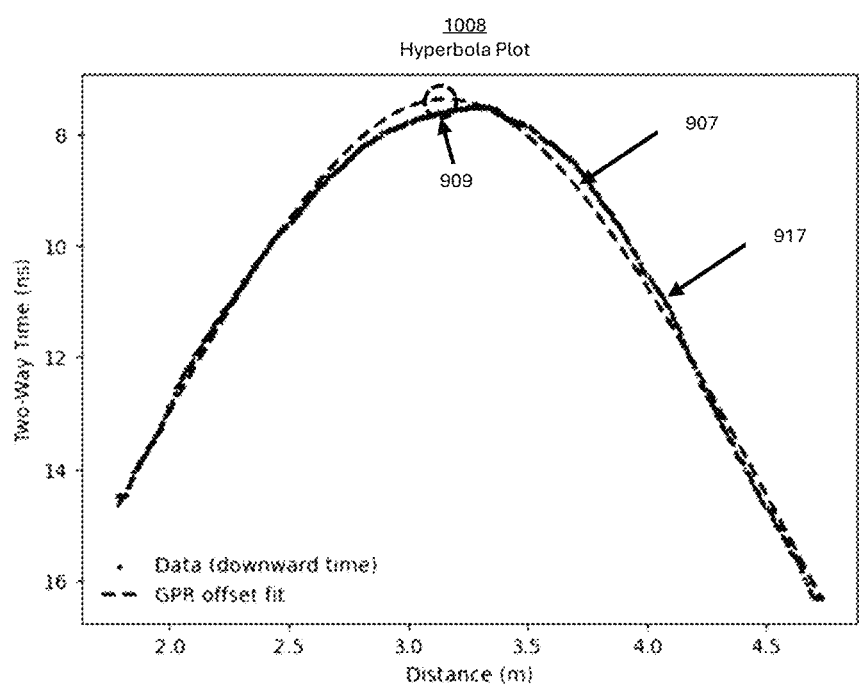
FIG. 10 shows a plot of the mask center points and the mask curve fit shown in FIG. 9C.

A plot 1008 of the centerline 917 and the hyperbola fit 907 shown in FIG. 9C is provided in FIG. 10. In this example, the location x, along the distance axis (i.e., the horizontal axis) of the apex point 909 of the hyperbola fit 907 is 3.155 m, and the location $t_0$ along the time axis (e.g., the vertical axis) of the apex point 909 is 7.378 ns. This indicates that the NDT scanner passed over the shallowest portion of the subsurface object after the scanner had moved approximately 3.1 m from its origin point and that the two-way travel time of the NDT signal as the NDT scanner passed over the shallowest portion of the subsurface object was approximately 7.3 ns.

Referring again to FIG. 4, after the geometric feature(s) of the hyperbola are identified at 406, the geometric features can be used to determine a physical property of at least a portion of the scanned region (e.g., a portion of the scanned region in a vicinity of the detected subsurface object). In the example method 400, the physical property that is determined is the dielectric constant of the portion of the scanned region. In other implementations, the physical property can be, e.g., the density of the scanned region.

In some implementations, the steepness of the hyperbola fit can be used to determine the velocity of the NDT signal in the portion of the scanned region surrounding the shallowest portion of the subsurface object. The determined velocity can then be used to determine the dielectric constant. For example, referring again to FIG. 10, the determined steepness of the hyperbola fit 907 indicates that the velocity of the NDT signal in the portion of the scanned region surrounding the shallowest portion of the subsurface object is 0.2165 m/ns. This signal velocity corresponds to a dielectric constant of 1.92.

Referring again to FIG. 4, after the physical properties of the scanned region are identified at 408, the depth beneath the ground surface of the scanned region at which the subsurface object is located can be determined at 410. The object depth can be determined using the determined physical properties (e.g., the dielectric constant, the signal velocity, etc.) and, in some implementations, the geometric feature(s) determined at 406. In the example shown in FIG. 10, the depth of the object was determined, based upon the signal velocity, to be 0.799 m, using the formula shown in Equation 2:

$$d = \frac{v \cdot t_0}{2} \qquad (2)$$

In Equation 2, d represents the object depth, v represents the signal velocity, and to represents the two-way travel time at the hyperbola apex (corresponding to the two-way signal travel time between the ground surface and the shallowest part of the buried object).

Although the systems and methods described herein focus primarily on NDT scanners with monostatic configurations (e.g., NDT scanners with a single transducer that functions as both a signal transmitter and a signal receiver), the described systems and methods can be adapted to NDT scanners with bistatic configurations (e.g., NDT scanners with transmitters and receivers that are spatially separated). For example, an NDT scanner can include two spatially separated antennas that form a fixed baseline. The positions of the transmitter and the receiver can be logged with IMUs or rigid frame offsets to enable automated depth estimation based on the geometry of the resulting subsurface features. In this example, the reflection curves in B-Scan images that correspond to buried objects can be ellipses whose foci coincide with the instantaneous ground projections of the transmitter and the receiver. A machine learning model (e.g., a segmentation model) can be trained to identify elliptical curves as well as (or instead of) hyperbolic curves. Elliptical loci detected by a trained machine learning model can be used to determine geometric features of the identified elliptical curves (e.g., elliptical shape). Using these geometric features, the depth of subsurface objects in a scanned region can be determined.

Certain illustrative implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting illustrative implementations and that the scope of the present invention is defined solely by the claims. The features illustrated or described in connection with one illustrative implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims.

The invention claimed is:

1. A method comprising:
receiving, from a non-destructive testing (NDT) scanner, a B-Scan image of a scanned region;
identifying, using a machine learning model, a set of pixels associated with a hyperbola in the B-scan image;
determining at least one geometric feature of the set of pixel;
determining, based upon the at least one geometric feature of the set of pixels, a dielectric constant in at least a portion of the scanned region; and
determining, based upon the dielectric constant, a depth of one or more objects beneath a surface of the scanned region.

2. The method of claim 1, wherein the machine learning model is a computer vision model.

3. The method of claim 2, wherein the machine learning model is an instance segmentation model.

4. The method of claim 1, wherein determining the at least one geometric feature of the set of pixels comprises:
determining a center line of the set of pixels;
determining a function that represents the center line.

5. The method of claim 1, wherein the at least one geometric feature comprises an apex location value, a curvature value, an amplitude value, or a combination thereof.

6. The method of claim 1, further comprising training the machine learning model using training data comprising a plurality of B-Scan images from a geographic location in which the scanned region is located.

7. The method of claim 1, further comprising training the machine learning model using training data comprising a plurality of B-Scan images generated by NDT scanners similar to the NDT scanner from which the B-Scan image was received.

8. The method of claim 1, further comprising, prior to identifying the set of pixels using the machine learning model, processing the B-Scan image.

9. The method of claim 8, wherein processing the B-Scan image comprises reducing noise in the B-Scan image, enhancing a contrast of the B-Scan image, or a combination thereof.

10. The method of claim 8, wherein processing the B-Scan image comprises:
receiving, from an inertial measurement unit (IMU) coupled to the NDT scanner, position data associated with the NDT scanner; and normalizing the B-Scan image based upon the position data.

11. The method of claim 1, further comprising providing information indicating the dielectric constant and the depth of the object to a user.

12. The method of claim 11, wherein providing the information indicating the dielectric constant and the depth of the object to a user comprises:

wirelessly transmitting the information indicating the dielectric constant and the depth of the object to a processor of the NDT scanner; and displaying the dielectric constant and the depth of the object to the user by a user interface of the NDT scanner.

13. A system comprising:

at least one processor; and non-transitory memory storing instructions that, when executed by the at least one processor, cause the at least one processor to perform operations comprising:

receiving, from a non-destructive testing (NDT) scanner, a B-Scan image of a scanned region;

identifying, using a machine learning model, a set of pixels associated with a hyperbola in the B-scan image;

determining at least one geometric feature of the set of pixels;

determining, based upon the at least one geometric feature of the set of pixels, a dielectric constant in at least a portion of the scanned region; and determining, based upon the dielectric constant, a depth of an object beneath a surface of the scanned region.

14. The system of claim 13, wherein the machine learning model is a computer vision model.

15. The system of claim 14, wherein the machine learning model is an instance segmentation model.

16. The system of claim 13, wherein determining the at least one geometric feature of the set of pixels comprises:

determining a center line of the set of pixels; and determining a function that represents the center line.

17. The system of claim 13, wherein the at least one geometric feature comprises an apex location value, a curvature value, an amplitude value, or a combination thereof.

18. The system of claim 13, further comprising the NDT scanner.

19. The system of claim 13, wherein the processor and the non-transitory memory are components of the NDT scanner.

20. A non-transitory computer readable storage medium storing instructions that, when executed by at least one processor, cause the at least one processor to perform operations comprising:

receiving, from a non-destructive testing (NDT) scanner, a B-Scan image of a scanned region;

identifying, using a machine learning model, a set of pixels associated with a hyperbola in the B-scan image;

determining at least one geometric feature of the set of pixels;

determining, based upon the at least one geometric feature of the set of pixels, a dielectric constant in at least a portion of the scanned region; and determining, based upon the dielectric constant, a depth of an object beneath a surface of the scanned region.

21. A method comprising:

receiving, from a non-destructive testing (NDT) scanner, a B-Scan image of a scanned region;

identifying, using a machine learning model, a set of pixels associated with a hyperbola in the B-scan image, wherein the machine learning model is an instance segmentation model;

determining at least one geometric feature of the set of pixels, wherein the at least one geometric feature comprises an apex location value;

determining, based upon the at least one geometric feature of the set of pixels, a dielectric constant in at least a portion of the scanned region; and determining, based upon the dielectric constant, a depth of one or more objects beneath a surface of the scanned region;

wirelessly transmitting the information indicating the dielectric constant and the depth of the object to a processor of the NDT scanner; and displaying the dielectric constant and the depth of the object to the user by a user interface of the NDT scanner.

* * * * *